United States Patent
Rau et al.

(10) Patent No.: US 9,603,305 B2
(45) Date of Patent: Mar. 28, 2017

(54) RETRACTABLE ROW CROP TIRE GUARD

(71) Applicant: AGCO Corporation, Hesston, KS (US)

(72) Inventors: Jeremiah T. Rau, Elko New Market, MN (US); Todd B. Snyder, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 14/936,864

(22) Filed: Nov. 10, 2015

(65) Prior Publication Data

US 2016/0128278 A1    May 12, 2016

Related U.S. Application Data

(60) Provisional application No. 62/077,541, filed on Nov. 10, 2014.

(51) Int. Cl.
| | |
|---|---|
| *B60R 19/00* | (2006.01) |
| *A01D 65/08* | (2006.01) |
| *A01B 76/00* | (2006.01) |
| *B62D 25/18* | (2006.01) |
| *B62D 25/16* | (2006.01) |

(52) U.S. Cl.
CPC .............. *A01D 65/08* (2013.01); *A01B 76/00* (2013.01); *B62D 25/16* (2013.01); *B62D 25/182* (2013.01)

(58) Field of Classification Search
CPC ...... A01D 65/08; B62D 25/16; B62D 25/182; A01B 76/00
See application file for complete search history.

(56) References Cited

U.S. PATENT DOCUMENTS

| 1,626,712 A | | 5/1927 | Agee | |
|---|---|---|---|---|
| 2,352,464 A | * | 6/1944 | Aerni | B62D 25/186 280/160 |
| 2,690,342 A | | 9/1954 | Willey | |
| 2,739,824 A | | 3/1956 | Kooiker | |
| 3,337,238 A | * | 8/1967 | Weasel, Jr. | B62D 25/188 280/851 |
| 5,850,727 A | | 12/1998 | Fox | |
| 5,974,773 A | | 11/1999 | Rieck et al. | |

FOREIGN PATENT DOCUMENTS

DE    1976093 U    12/1967

OTHER PUBLICATIONS

Intellectual Property Office, International Search Report for related UK application No. GB1508044.3, dated Oct. 29, 2015.

* cited by examiner

*Primary Examiner* — Lori L Lyjak

(57) ABSTRACT

A tire guard for a wheel of an agricultural vehicle includes a fender having a first width substantially covering a width of the wheel and a crop shield having a forward area and a back area. A first bracket connects the fender to the wheel and a second bracket connects the crop shield to the wheel. The crop shield is movable over the fender between a first position and a second position. In the first position, the forward area of the crop shield is disposed proximate an upper portion of the wheel and the back area of the crop shield is disposed proximate a rear portion of the wheel. In the second position, the forward area of the crop shield is disposed proximate a front portion of the wheel and the back area of the crop shield is disposed proximate an upper portion of the wheel.

20 Claims, 3 Drawing Sheets

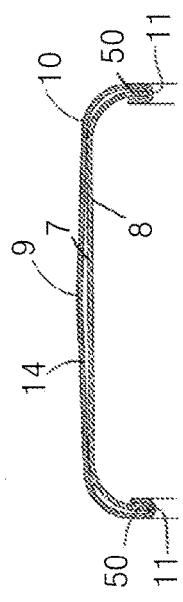
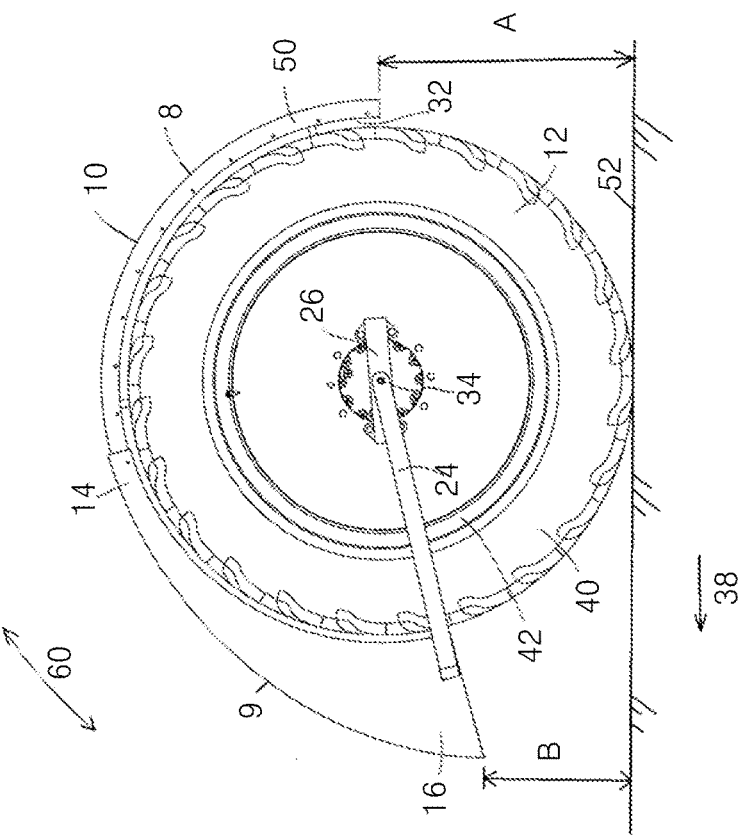
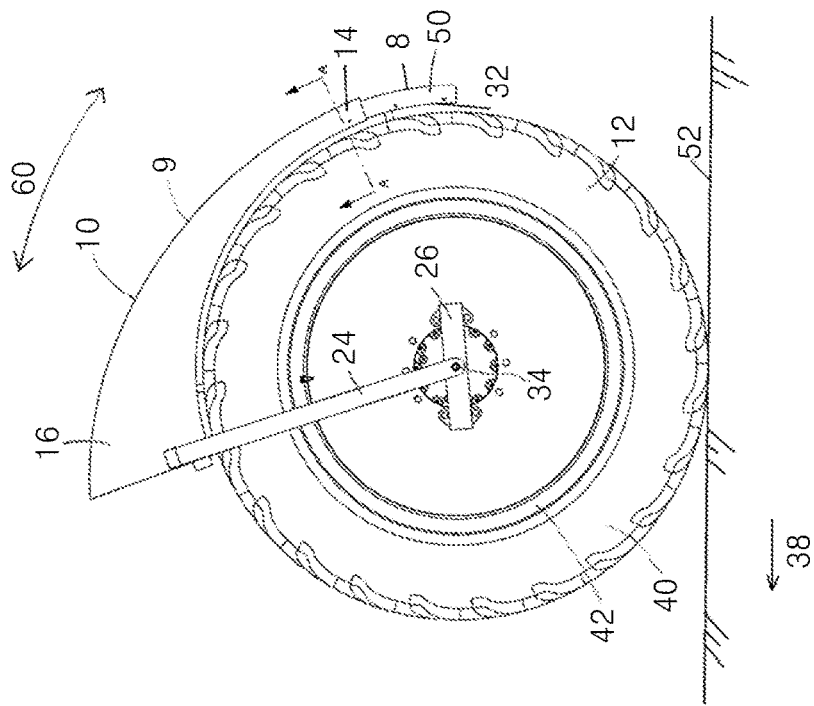
FIG. 1A
FIG. 2
FIG. 1

RETRACTABLE ROW CROP TIRE GUARD

RELATED APPLICATION

Under provisions of 35 U.S.C. §119(e), Applicant claims the benefit of U.S. Provisional Application No. 62/077,541, entitled RETRACTABLE ROW CROP TIRE GUARD and filed Nov. 10, 2014, which is hereby incorporated by reference.

BACKGROUND OF THE INVENTION

Field of Invention

The present invention relates generally to agricultural vehicles movable in a travel direction through a field of row-planted crops, and more particularly, to a tire guard for use with a ground-engaging wheel of an agricultural vehicle Description of Related Art The plants of certain row crops, such as corn, cotton and soybeans, for example, can branch out and block the aisles between the planted rows when fully matured. For some crops, spacing between rows may be about 15-30 inches, though wide variation is possible. When harvesting machinery enters the field, the vehicle (e.g., tractor, harvester, sprayer, etc.) proceeds with its wheels placed between the rows. However, the wheels of the vehicle can run over and crush the crop that extends into the aisles, resulting in significant crop loss.

Crop shields may be installed on the front side of machine tires to prevent the tires from running over and destroying dense crop growth. The crop shield separates rows of crops and allows each wheel of the machine to pass through the separated vegetation, thereby preventing the tires from becoming entangled with the crops.

Typically, a crop shield is an attachment for a wheel that is positioned at a front of a wheel (with respect to a travel direction of the vehicle) and includes a forward pointing configuration for lifting and turning aside stalks that have fallen or are inclined from the planted rows. Thus, the crops will not be run over by the vehicle wheel but instead will be pushed aside and lifted into position for cultivation, stalk cutting, harvesting, or other action. However, current crop shields are bulky, heavy and take many hours to install onto an agricultural implement.

OVERVIEW OF THE INVENTION

In one aspect, a tire guard is designed for use with a ground-engaging wheel of a device that is movable in a travel direction. The tire guard comprises a fender portion having a first width substantially covering a width of the wheel; a crop shield portion having forward area and a back area; a first bracket assembly connecting the fender portion to the wheel; and a second bracket assembly connecting the crop shield portion to the wheel; wherein the crop shield portion is movable over the fender portion between a first position and a second position. In the first position, the forward area of the crop shield portion is disposed proximate an upper portion of the wheel and the back area of the crop shield portion is disposed proximate a rear portion of the wheel relative to the travel direction. In the second position, the forward area of the crop shield portion is disposed proximate a front portion of the wheel relative to the travel direction and the back area of the crop shield portion is disposed proximate an upper portion of the wheel.

In another aspect, a tire guard is designed for use with a ground-engaging wheel of a device that is movable in a travel direction, the tire guard comprising a fender portion, a crop shield portion, a first bracket assembly, and a second bracket assembly. The fender portion has a first width substantially covering a width of the wheel. The crop shield portion has a forward area and a back area. The first bracket assembly connects the fender portion to the wheel. A second bracket assembly connects the crop shield portion to the wheel. The crop shield portion is movable over the fender portion between a first position, wherein a major portion of the fender portion is covered by the crop shield portion; and a second position, wherein a major portion of the fender portion is exposed by the crop shield portion.

In yet another aspect, a method of using a tire guard with a ground-engaging wheel of a device that is movable in a travel direction is disclosed. The tire guard comprises a fender portion having a first width substantially covering a width of the wheel; a crop shield portion having a forward area and a back area; a first bracket assembly connecting the fender portion to the wheel; and a second bracket assembly connecting the crop shield portion to the wheel. The method comprises moving the crop shield portion over the fender portion between a first position and a second position; wherein in the first position, a major portion of the fender portion is covered by the crop shield portion; and wherein in the second position, a major portion of the fender portion is exposed by the crop shield portion.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

FIG. 1 is a side elevation view of an outside of a wheel with an exemplary tire guard in a fender configuration.

FIG. 1A is a cross-sectional view through line A-A of FIG. 1, with the tire removed.

FIG. 2 is a side elevation view of an outside of a wheel with an exemplary tire guard in a crop shield configuration.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

The figures may not be drawn to scale. In particular, some features may be enlarged relative to other features for clarity. Moreover, where terms such as above, below, over, under, top, bottom, side, right, left, etc., are used, it is to be understood that they are used only for ease of understanding the description. It is contemplated that structures may be oriented otherwise.

DETAILED DESCRIPTION

The present disclosure is directed to a retractable tire guard 10 that allows an operator to move a portion of the tire guard 10 over a wheel 12, such as by a pivoting motion, for example, to change between a fender configuration and a crop shield configuration. FIGS. 1-6 show an exemplary tire guard 10 designed for use with the ground-engaging wheel 12 of an agricultural vehicle, such as a sprayer or tractor that is movable in a travel direction across a crop field. Such a tire guard 10 may be formed of rubber, plastic, metal or a combination thereof. Tire guard 10 includes fender portion 8 and crop shield portion 9.

Figure 3:
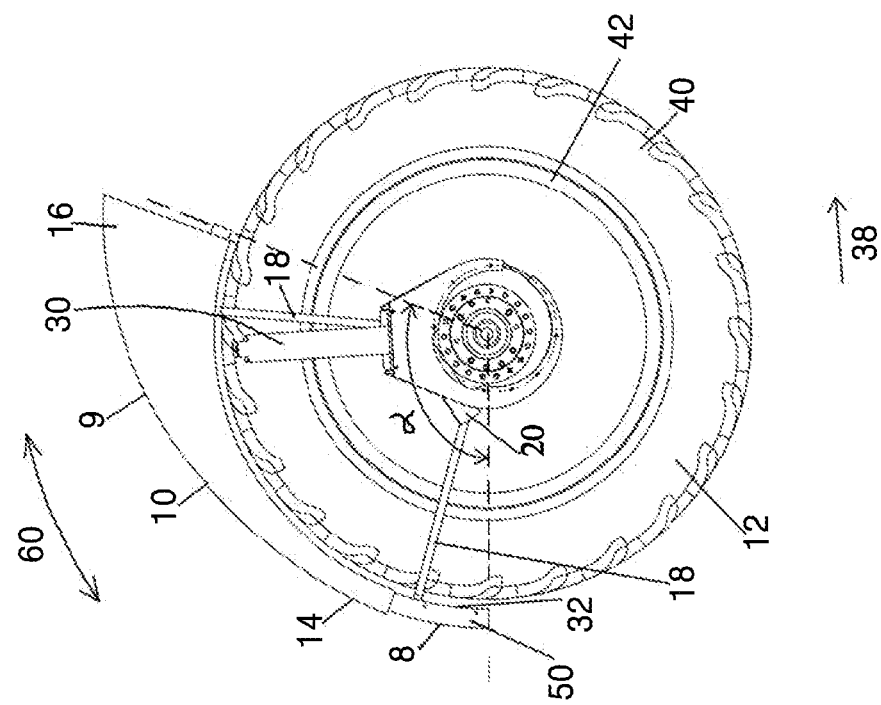
FIG. 3 is an inside side elevation view of a wheel with the tire guard in the fender configuration, as in FIG. 1.
Figure 5:
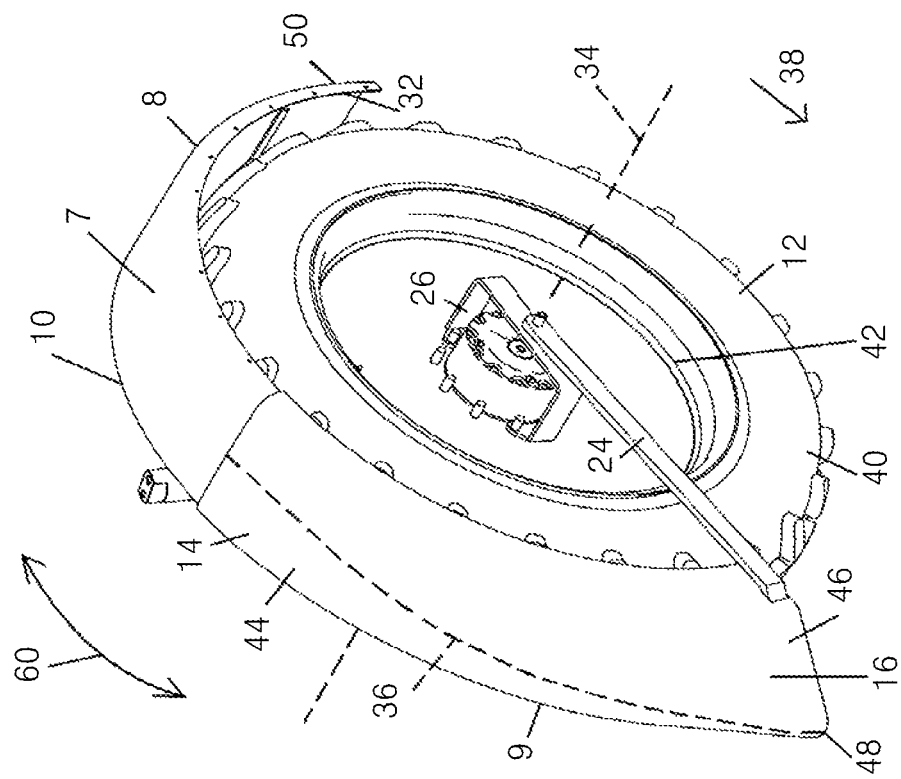
FIG. 5 is an outside front perspective view of the exemplary tire guard in the fender configuration, as in FIGS. 1 and 3.

In FIGS. 1, 3 and 5, crop shield portion 9 is retracted over fender portion 8, so that tire guard 10 serves as a fender to prevent mud, rocks and other debris from being picked up by the wheel 12 and thrown upward onto the agricultural vehicle. In the illustrated fender configuration of FIGS. 1, 3 and 5, a major portion of the fender portion 8 is covered by the crop shield portion 9; in other words, crop shield portion 9 overlies more than half of a surface 7 (labeled in FIG. 6) of fender portion 8. In an exemplary embodiment, as shown in FIG. 1A, fender portion 8 is relatively flat in a central area thereof, with a width substantially covering wheel 12, and follows a contour of wheel 12. Fender portion 8 has side flanges 50 that extend downward from the substantially flat surface 7, toward lower edge 32. In an exemplary embodiment, crop shield portion 9 fits over and around fender portion, forming channels 11 along the length of crop shield portion 9 at the sides thereof, in which the side flanges 50 of fender portion 8 are received. While exemplary cooperating, telescoping structures of fender portion 8 and crop shield portion 9 are described, it is contemplated that other structures may also be used. For example, a channel in fender portion 8 may accept a part of crop shield portion 9. Moreover, other cooperating features allowing a sliding motion can also be used and may be located in positions other than the side edges of components. In an exemplary embodiment, crop shield portion 9 is relatively flat in a central area thereof at back area 14 and follows an arcuate curve away from wheel 12 as it forms a pointed forward area 16.

Figure 4:
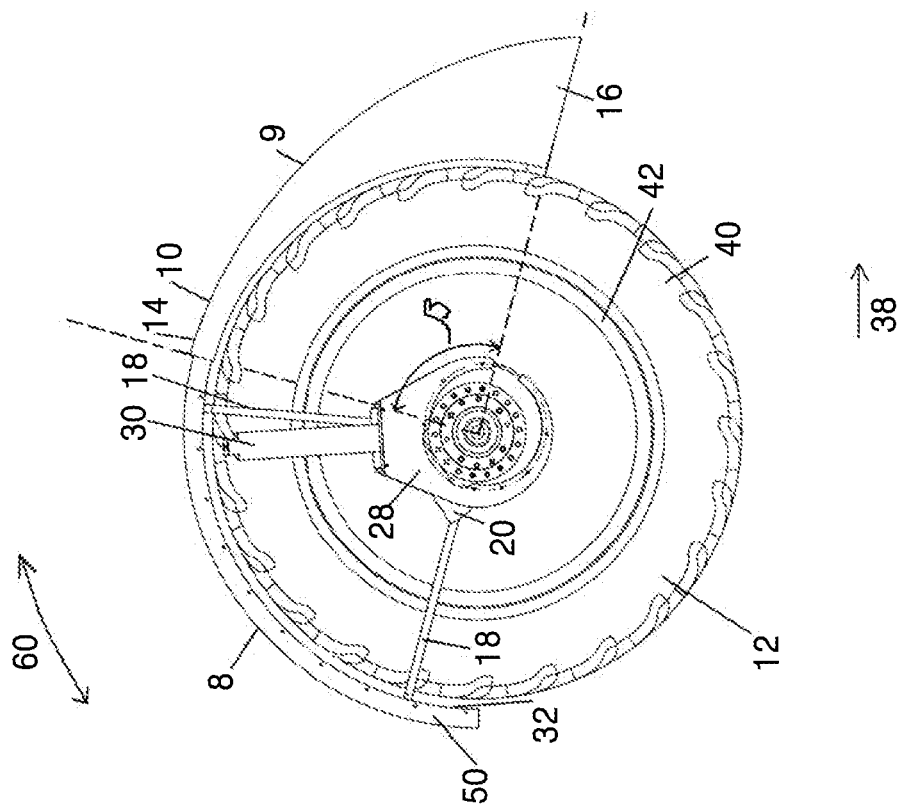
FIG. 4 is an inside elevation view of a wheel with an exemplary tire guard in the crop shield configuration, as in FIG. 2.
Figure 6:
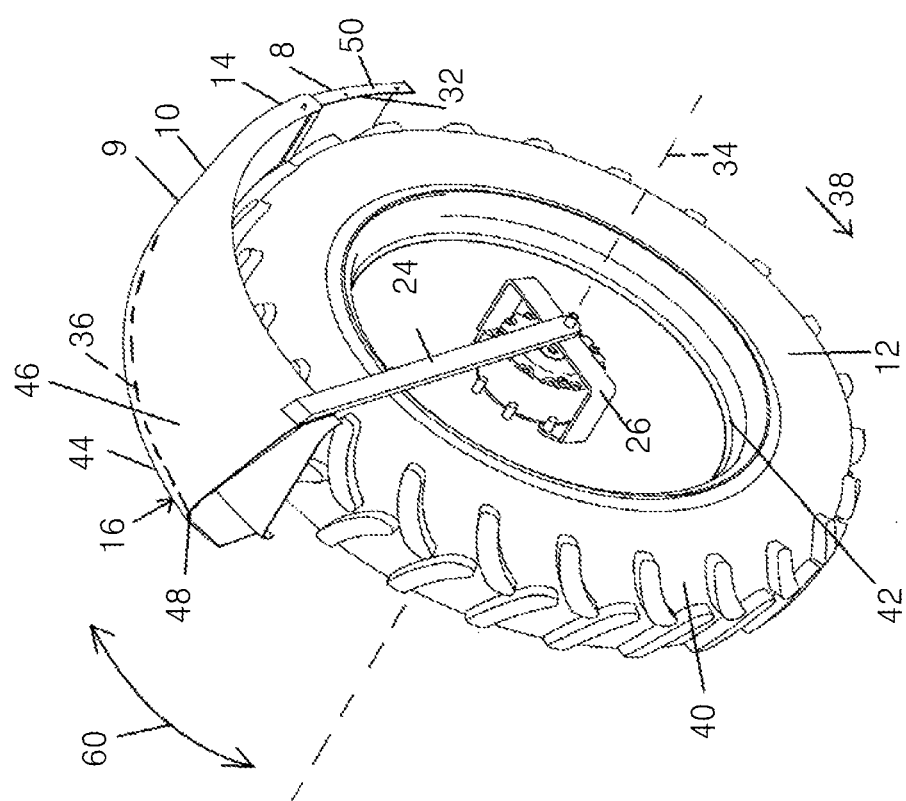
FIG. 6 is an outside front perspective view of an exemplary tire guard in the crop shield configuration, as in FIGS. 2 and 4.

FIGS. 2, 4 and 6 show crop shield portion 9 telescoped forward on fender portion 8 to transform tire guard 10 into a crop shield configuration. In the illustrated crop shield configuration, a major portion of the fender portion 8 is exposed by the crop shield portion 9; more than half of the surface 7 (labeled in FIG. 6) of fender portion 8 is not covered by crop shield portion 9. In this configuration, the agricultural implement may be driven forward through a field of row-planted crops, wherein tire guard 10 separates the crops growing between the rows and lifts fallen stalks into a more upright position. As wheel 12 travels in the forward travel direction indicated by arrow 38, the pointed surface of forward area 16 of crop shield portion 9 contacts the crops. As shown in FIGS. 5 and 6, center line 36 runs from peak 48 of forward area 16 and separates first side 44 and second side 46. To form a point at peak 48, the angle between first side 44 and second side 46 is less than 180 degrees at forward area 16. The contacted plant matter follows crop shield portion 9 outward and upward and along each side 44, 46. Thus, the plant stalks are separated and lifted, thereby preventing wheel 12 from crushing them. It is contemplated that forward area 16 may possess a configuration that is more or less pointed than illustrated in the drawings figures. As illustrated, in an exemplary embodiment, the shape of tire guard 10 includes a smooth arc along center line 36 between forward area 16 and back area 14.

Tire guard 10 has a width that substantially covers a width of wheel 12, as shown in FIGS. 5 and 6. In an exemplary embodiment, when tire guard 10 is in the fender configuration as show in FIGS. 1, 3 and 5, the forward area 16 of the crop shield portion 9 is disposed proximate an upper portion of the wheel 12 and the back area 14 of the crop shield portion 9 is disposed proximate a rear portion of the wheel 12 relative to the travel direction 38.

As shown in FIGS. 3 and 4, in an exemplary embodiment, fender portion 8 is attached to wheel 12 by a bracket assembly including brackets 18 and plate 20. The illustrated wheel 12 is one on a 4-wheel drive, hydrostatically driven machine. Thus, at each wheel 12, there is a hydraulic motor and a gear box (not labeled). Motor housing 28 is the support for wheel 12 and the mounting housing for the wheel motor and gearbox. In an exemplary embodiment, plate 20 is fixedly mounted on motor housing 28 and/or wheel leg 30 of wheel 12. The position of such fixation may be determined for a particular application using conventional hardware and methods. Motor housing 28 and wheel leg 30 are attached to a steering arm and/or axle of the agricultural implement, as conventionally known.

FIGS. 1, 2, 5 and 6 show that in an exemplary embodiment, crop shield portion 9 is attached to an outside of wheel 12 by bracket 24 and plate 26. In an exemplary embodiment, plate 26 is fixedly mounted on wheel 12 by known fasteners such as bolts, for example. Bracket 24 is pivotally mounted on plate 26 to allow bracket 24, and therefore the attached crop shield portion 9, to pivot around rotation axis 34. In an exemplary embodiment, rotation axis 34 coincides with a rotation axis of wheel 12. Crop shield portion 9 may be telescoped backward and forward over fender portion 8 between the fender configuration shown in FIGS. 1, 3 and 5 and the crop shield configuration shown in FIGS. 2, 4 and 6. In the crop shield configuration, the forward area 16 of the crop shield portion 9 is disposed proximate a front portion of the wheel 12 relative to the travel direction 38 and the back area 14 of the tire guard 10 is disposed proximate an upper portion of the wheel 12. While exemplary positions of the components of tire guard 10 are illustrated and shown, it is contemplated that tire guard 10 may be positioned differently than shown. Moreover, while a particular configuration of tire guard 10 is illustrated with respect to wheel 12, it is contemplated that tire guard 10 may have a length and/or configuration different than that shown.

In an exemplary embodiment, wheel 12 includes tire 40 installed onto rim 42. In an exemplary embodiment, lower edge 32 of each flange 50 possesses a contour that substantially follows that of tire 40, while allowing a clearance gap to prevent binding of tire guard 10 on tire 40, even with accumulation of mud, dirt, vegetation, or other debris. Thus, in an exemplary embodiment, brackets 18 and 24 serve to support fender portion 8 and crop shield portion 9, respectively, in a position so that lower edge 32 and the rest of tire guard 10 are spaced from a tread of tire 40.

Following are exemplary dimensions for a tire guard 10 used with a tire 40 having a size code of 380/80R42. Such a tire 40 has a tire section width of 380 mm; an aspect ratio (percentage of sidewall height to section width) of 80; Radial construction; a diameter of rim 42 of about 1.07 m (42 inches); and an overall diameter of about 1.69 m (66.6 inches).

For such a tire 40, a particularly suitable tire guard 10 has a fender portion 8 with approximate dimensions as follows: width of about 420 mm, with a range from about 345 mm to about 495 mm; and angular sweeping arc "α" (shown in FIG. 3) of about 115 degrees, with a range from about 85 degrees to about 145 degrees.

The dimensions of crop shield portion 9 vary with the size of the fender portion 8; the crop shield portion 9 in some dimensions, such as width and thickness, is at least slightly larger than fender portion 8 to allow for nesting and sliding motion. A particularly suitable crop shield portion 9 has approximate dimensions as follows: width of about 435 mm, with a range from about 360 mm to about 510 mm; angular sweeping arc "β" (shown in FIG. 4) of about 90 degrees, with a range from about 60 degrees to about 120 degrees; inner radius (distance from axis 34 to center line 36 at back area 14) of about 880 mm, with a range from about 870 mm to about 890 mm; outer radius (distance from axis 34 to center line 36 at forward area 16) of about 1300 mm, with a range from about 950 mm to about 1650 mm; at the front portion 16, the two sides 44, 46 meet at peak 48 at an angle of about 75 degrees, with a range from about 25 degrees to about 125 degrees; and a radius of curvature of peak 48 is about 50 mm, with a range from about 10 mm to about 90 mm.

In the illustrated embodiment, distance "A" in FIG. 2 between the back of fender portion 8 and ground surface 52 is about 845 mm to about 915 mm and distance "B" between forward area 16 and ground surface 52 is about 305 mm to about 410 mm. It is contemplated that all dimensions may be different than shown and described, especially when different tire sizes are used.

Suitable materials for tire guard 10 include plastic (for example, polyethylene having a thickness of about 3-8 mm), composite materials (including many options, such as fiberglass having a thickness of about 3-8 mm), metals such as steel or aluminum (formed by means such as stamping or deep-drawing, for example, and having a thickness of about 16 GA to about 30 GA) and rubber or other resilient materials. Brackets 18, 24 and plates 20, 26 may be made of materials such as steel, aluminum, stainless steel, or cast iron, for example. Brackets 18, 24 may be in the form of bent sheet metal, square or round tubes, a combination thereof, or other forms.

The disclosed dimensions and materials are exemplary and not to be construed as limiting. Moreover, it is contemplated that tire guards having other dimensions are suitable for tires of different sizes.

In an exemplary embodiment, the movement of tire guard 10 between the fender position and the crop shield position is essentially a pivoting motion about the rotation axis 34 of wheel 12 (such as along arc arrow 60). Movement of tire guard 10 from the fender configuration shown in FIGS. 1, 3 and 5 to the crop shield configuration shown in FIGS. 2, 4 and 6 can be accomplished by means including manual actuation or automatic actuation by electrical or hydraulic means, for example. Moreover, a latch, detent, or other lock mechanism can be used to retain tire guard 10 in the desired configuration.

When tire guard 10 is not required in the crop shield configuration as shown in FIGS. 2, 4 and 6, crop shield portion 9 can be retracted back over fender portion 8 to form the fender configuration shown in FIGS. 1, 3 and 5. Thus, crop shield portion 9 remains on the vehicle at all times and eliminates the task for personnel of installing a crop shield when needed and removing the crop shield when not needed.

Although the subject of this disclosure has been described with reference to several embodiments, workers skilled in the art will recognize that changes may be made in form and detail without departing from the spirit and scope of the disclosure. In addition, any feature disclosed with respect to one embodiment may be incorporated in another embodiment, and vice-versa.

What is claimed is:

1. A tire guard for use with a ground-engaging wheel of an agricultural vehicle that is movable in a travel direction through a field of row-planted crops, the tire guard comprising:
    a fender portion having a first width substantially covering a width of the wheel;
    a crop shield portion having forward area and a back area;
    a first bracket assembly connecting the fender portion to the wheel; and
    a second bracket assembly connecting the crop shield portion to the wheel;
    wherein the crop shield portion is movable over the fender portion between:
        a first position, wherein the forward area of the crop shield portion is disposed proximate an upper portion of the wheel and wherein the back area of the crop shield portion is disposed proximate a rear portion of the wheel relative to the travel direction; and
        a second position, wherein the forward area of the crop shield portion is disposed proximate a front portion of the wheel relative to the travel direction and wherein the back area of the crop shield portion is disposed proximate an upper portion of the wheel.

2. The tire guard of claim 1 wherein the crop shield portion is pivotable about the wheel.

3. The tire guard of claim 2 wherein an axis of rotation of the crop shield portion coincides with an axis of rotation of the wheel.

4. The tire guard of claim 1 wherein the crop shield portion comprises a center line along a length of the crop shield portion, and wherein two sides of the crop shield portion on either side of the center line meet at the forward area of the crop shield portion at a peak along the center line, wherein the peak has an angle less than 180 degrees.

5. The tire guard of claim 4 wherein the two sides of the crop shield portion meet at a flat back area of the crop shield portion.

6. The tire guard of claim 1 wherein the crop shield portion has a second width that is greater than the first width.

7. The tire guard of claim 1 wherein the crop shield portion has a channel along a length thereof sized for acceptance of the fender portion.

8. The tire guard of claim 7 wherein the fender portion comprises a flange is that sized for insertion into the channel.

9. A tire guard for use with a ground-engaging wheel of a device that is movable in a travel direction, the tire guard comprising:

a fender portion having a first width substantially covering a width of the wheel;

a crop shield portion having a forward area and a back area;

a first bracket assembly connecting the fender portion to the wheel; and a second bracket assembly connecting the crop shield portion to the wheel;

wherein the crop shield portion is movable over the fender portion between:

a first position, wherein a major portion of the fender portion is covered by the crop shield portion; and a second position, wherein a major portion of the fender portion is exposed by the crop shield portion.

10. The tire guard of claim 9 wherein the crop shield portion is pivotable about the wheel.

11. The tire guard of claim 10 wherein an axis of rotation of the crop shield portion coincides with an axis of rotation of the wheel.

12. The tire guard of claim 9 wherein the crop shield portion comprises a center line along a length of the crop shield portion, and wherein two sides of the crop shield portion on either side of the center line meet at the forward area of the crop shield portion at a peak along the center line, wherein the peak has an angle less than 180 degrees.

13. The tire guard of claim 12 wherein the two sides of the crop shield portion meet at a flat back area of the crop shield portion.

14. The tire guard of claim 9 wherein the crop shield portion has a second width that is greater than the first width.

15. The tire guard of claim 9 wherein the crop shield portion has a channel along a length thereof sized for acceptance of the fender portion.

16. The tire guard of claim 15 wherein the fender portion comprises a flange sized for insertion into the channel.

17. A method of using a tire guard with a ground-engaging wheel of a device that is movable in a travel direction, wherein the tire guard comprises:

a fender portion having a first width substantially covering a width of the wheel;

a crop shield portion having a forward area and a back area;

a first bracket assembly connecting the fender portion to the wheel; and a second bracket assembly connecting the crop shield portion to the wheel;

the method comprising:

moving the crop shield portion over the fender portion between a first position and a second position;

wherein in the first position, a major portion of the fender portion is covered by the crop shield portion; and wherein in the second position, a major portion of the fender portion is exposed by the crop shield portion.

18. The method of claim 17, further:

wherein in the first position, the forward area of the crop shield portion is disposed proximate an upper portion of the wheel and wherein the back area of the crop shield portion is disposed proximate a rear portion of the wheel relative to the travel direction; and wherein in the second position, the forward area of the crop shield portion is disposed proximate a front portion of the wheel relative to the travel direction and wherein the back area of the crop shield portion is disposed proximate an upper portion of the wheel.

19. The method of claim 17 wherein moving the crop shield portion over the fender portion comprises pivoting the crop shield portion about the wheel.

20. The method of claim 19 wherein pivoting the crop shield portion about the wheel comprises pivoting about a rotation axis of the wheel.

* * * * *